United States Patent [19]

Masseth

[11] E Re. 29,111

[45] Reissued Jan. 11, 1977

[54] PHOTOGRAPHIC DEVELOPER COMPOSITION CONTAINING FORMALDEHYDE BISULFITE ALKANOLAMINE CONDENSATION PRODUCT AND FREE ALKANOLAMINE

[75] Inventor: Thomas J. Masseth, Sweden, N.Y.

[73] Assignee: Eastman Kodak Company, Rochester, N.Y.

[22] Filed: Jan. 7, 1976

[21] Appl. No.: 647,299

Related U.S. Patent Documents

Reissue of:

[64] Patent No.: 3,573,914
Issued: Apr. 6, 1971
Appl. No.: 661,532
Filed: Aug. 18, 1967

U.S. Applications:

[63] Continuation-in-part of Ser. No. 583,935, Oct. 3, 1966, abandoned.

[52] U.S. Cl. ..... 96/66.4; 96/66 HD

[51] Int. Cl.[2] ..... G03C 5/30

[58] Field of Search ..... 96/66, 63, 62, 66.3, 96/66.4

[56] References Cited

UNITED STATES PATENTS

| | | | |
|---|---|---|---|
| 2,388,816 | 11/1945 | Bean | 96/266.1 |
| 2,757,091 | 7/1956 | Oretzky | 96/266.3 |
| 3,232,761 | 2/1966 | Allen et al. | 96/266 |

*Primary Examiner*—Edward C. Kimlin
*Attorney, Agent, or Firm*—A. P. Lorenzo

[57] ABSTRACT

Photographic developer composition for high-contrast elements comprising a *dihydroxybenzene* developing agent, a [carbonyl bisulfite-amine] *formaldehyde bisulfite-alkanolamine* condensation product and free [amine] *alkanolamine*. A continuous process for using the developer composition in a continuous transport processing machine is also described.

17 Claims, No Drawings

PHOTOGRAPHIC DEVELOPER COMPOSITION CONTAINING FORMALDEHYDE BISULFITE ALKANOLAMINE CONDENSATION PRODUCT AND FREE ALKANOLAMINE

Matter enclosed in heavy brackets [ ] appears in the original patent but forms no part of this reissue specification; matter printed in italics indicates the additions made by reissue.

This application is a continuation-in-part of my copending application Ser. No. 583,935 filed Oct. 3, 1966 now abandoned.

BACKGROUND OF THE INVENTION

Field of the Invention

This invention relates to photographic materials, their preparation and use. One aspect of this invention relates to stable photographic developer compositions used for developing high-contrast photographic elements. Another aspect relates to a continuous process for using such developer compositions in a continuous transport processing machine to eliminate drag streaks and dot distortions.

Description of the Prior Art

In the graphic arts field, where it is desired to make photographic line and halftone reproductions, it is customary to employ emulsions having extremely high contrast. In development, the developing areas grow autocatalytically at a very high developing rate to produce an extremely high contrast which is necessary for halftone patterns. Developers for use with extremely high-contrast photographic films are quite different in composition from typical black-and-white film developers. In order to obtain very high contrast and sharp halftone dots, it has been the practice to formulate developers for such films from essentially hydroquinone, an alkali, an alkali metal bromide and a low level of sulfite ion. The low level of sulfite ion partially stabilizes the developer solution for a short period of time and is achieved in all known commercial developers of this type by the use of sodium formaldehyde bisulfite, which acts as a sulfite ion buffer. These developer solutions must be stored in two parts, however, since the sodium formaldehyde bisulfite will dissociate at a high pH to give not only the desired sulfite ion but an equimolar amount of formaldehyde which will react with hydroquinone to destroy its developing power. It would be very desirable to have a stable developer solution for high-contrast photographic elements that would not have to be stored in two parts and could be left in a developer tray for several weeks.

In reproducing continuous tone material, it is customary to make a halftone photographic intermediate, usually a film negative, in which the gradations in tone are represented by differing sizes of dots of uniform density. The shape, density and uniformity of the halftone dots are closely correlated to the quality of the resulting picture.

The developer solutions for high-contrast films presently used in continuous transport processing machines also have a number of disadvantages. The photographic quality obtained with a given film is usually inferior to that obtained in careful tray processing. The sensitivity of high-contrast films to developer exhaustion products and variations in local developing agent concentration makes these films vulnerable to directional drag streaks in film halftone areas under conditions of machine processing. These drag streaks occur in areas of high development (50–90% dots) which are adjacent to areas of low development (dot area of 20% or less). The drag streaks are formed by more development occuring because the developer which is "dragged in" from the area of low development contains more developing agent and less exhaustion products (primarily bromide ion) than the developer that would normally be in that area. The dots in a high-contrast film are also distorted and exhibit size changes depending on the orientation and direction of travel through the machine processor. This dot distortion is a manifestation of discontinuities or plateaus in the H and D curve of high-contrast films which are processed in continuous transport processing machines. It would be very desirable to have a developer solution for high-contrast films which could be used in continuous transport processing machines without causing drag streaks and dot distortions and at the same time be stable so that it could be left in the machine processor for several weeks.

U.S. Pat. No. 2,388,816 of Bean issued Nov. 13, 1945, discloses concentrated photographic developing solutions which contain alkali metal salts of aminomethane sulfonates and of aminomethane sulfinates. The solution does not contain any free [amine] *alkanolamine* as set forth in my invention, however, *nor any other free amine of any other type*, and is not used in a continuous transport processing machine. Moreover, it does not disclose any minimum concentration for the free [amine] *alkanolamine* which is necessary to provide a stable solution.

U.S. Pat. No. 1,925,557 of Dundon issued Sept. 5, 1933, discloses that alkyl amines may be used as an alkali substitute in a developer solution. This patent does not disclose the use of [carbonyl bisulfite-amine] *formaldehyde bisulfite-alkanolamine* condensation products as in my invention, however, *nor of any carbonyl bisulfite-amine condensation products of any other type*, and does not disclose that such solutions could be used in continuous transport processing machines. In addition, this patent does not disclose the minimum concentration for the free [amine] *alkanolamine* which I have found to be necessary in order to provide a stable solution.

SUMMARY OF THE INVENTION

In my invention, a continuous process is provided for processing an exposed, high-contrast photographic element wherein said element is processed in one continuous motion by transporting it into and out of at least one processing solution in the manner shown, for example, by U.S. Pats. 3,025,779 of Russell and Kunz issued Mar. 20, 1962; 3,078,024 of Sardeson issued Feb. 19, 1963; 3,122,086 of Fitch issued Feb. 25, 1964; 3,149,551 of Cramer issued Feb. 22, 1964; 3,156,173 of Meyer issued Nov. 10, 1964; and 3,224,356 of Fleisher and Hixon issued Feb. 21, 1965; and wherein said element is developed in a novel liquid developer composition comprising:

(a) a *dihydroxybenzene* developing agent, (b) a [carbonyl bisulfite-amine] *formaldehyde bisulfite-alkanolamine* condensation product, and (c) at least about 0.075 mole of free [amine] *alkanolamine* per liter of developer composition. Concentrations of free [amine] *alkanolamine* below this amount do not provide a stable developer solution as will be shown in Example 2 hereinafter.

DESCRIPTION OF THE PREFERRED EMBODIMENTS

The developing agents which can be employed in my novel developer compositions [can be any of those suitable for the intended purpose. Suitable silver halide developing agents, for example, include] *are* the dihydroxybenzenes such as hydroquinone,
chlorohydroquinone,
bromohydroquinone,
isopropylhydroquinone,
toluhydroquinone,
methylhydroquinone,
2,3-dichlorohydroquinone,
2,5-dimethylhydroquinone,
2,3-dibromohydroquinone,
1,4-dihydroxy-2-acetophenone-2,5-dimethylhydroquinone,
2,5-diethylhydroquinone,
2,5-di-p-phenethylhydroquinone,
2,5-dibenzoylaminohydroquinone,
2,5-diacetaminohydroquinone, etc.

Esters of such compounds, e.g., formates and acetates, can also be employed. These developing agents can be used alone or in any combination and can be employed in any concentration which is effective for development. A suitable concentration for the developing agent is from about 0.05 to about 0.50 mole per liter of developer composition and is preferably from about 0.10 to about 0.30 mole per liter of developer composition.

The [carbonyl bisulfite-amine] *formaldehyde bisulfite-alkanolamine* condensation products which can be used in my novel developer composition are [preferably formaldehyde bisulfite-amine condensation] products such as sodium-2-hydroxyethylaminomethane sulfonate,
sodium-2-hydroxypropylaminomethane sulfonate,
sodium-1,1-dimethyl-2-hydroxyethylaminomethane sulfonate,
sodium-1,1-bis(hydroxymethyl)ethylaminomethane sulfonate,
sodium-tris(hydroxymethyl)methylaminomethane sulfonate,
sodium-3-hydroxypropylaminomethane sulfonate,
sodium-bis(2-hydroxyethyl)aminomethane sulfonate,
sodium-N,N-bis(2[1-hydroxy]propyl aminomethane sulfonate,
sodium-N-isopropyl-N-(2-hydroxyethyl)-aminomethane sulfonate,
sodium-N-ethyl-N-(2-hydroxyethyl)-aminomethane sulfonate, and
sodium-N-methyl-N-(2-hydroxyethyl)-aminomethane sulfonate.

The [carbonyl bisulfite-amine] *formaldehyde bisulfite-alkanolamine* condensation products can be used alone or in any combination and can be employed in any concentration which is effective to provide a low level of sulfite ion for the developer composition. A suitable concentration for the [carbonyl bisulfite-amine] *formaldehyde bisulfite-alkanolamine* condensation product is from about 0.1 to about 1.0 mole per liter of liquid developer composition and is preferably from about 0.25 to about 0.50 mole per liter of liquid developer composition.

The [carbonyl bisulfite-amine] *formaldehyde bisulfite-alkanolamine* condensation product can be added to the developer composition as a separate compound or formed in situ. Methods for preparing these compounds are disclosed, for example, in U.S. Pat. No. 2,388,816 of Bean issued Nov. 13, 1945. In this specification and claims it is meant to include within the definition of [carbonyl bisulfite-amine] *formaldehyde bisulfite-alkanolamine* condensation product either the compound itself or the individual components which form the compound in situ.

The free or uncombined [amine] *alkanolamine* compounds which can be employed in my novel developer compositions include primary and secondary [amines] *alkanolamines* such as 2-aminoethanol,
1-amino-2-propanol,
2-amino-2-methyl-1-propanol,
2-amino-2-methyl-1,3-propanediol,
2-amino-2(hydroxymethyl)-1,3-propanediol,
3-amino-1-propanol,
2,2'-iminodiethanol,
di-iso-propanolamine,
2-isopropylaminoethanol,
2-ethylaminoethanol,
2-methylaminoethanol, etc.

These [amines] *alkanolamines* can be used alone or in any combination and should be employed in a concentration of at least about 0.075 mole per liter of developer composition. As indicated previously, concentrations of the [amine] *alkanolamine* below this minimum value do not provide a stable developer composition as will be shown in Example 2. A suitable range of concentrations for the [amine] *alkanolamine* compound is from about 0.075 to about 3.0 moles per liter of developer composition and is preferably from about 0.20 to about 0.90 mole per liter of developer composition. The free [amine] *alkanolamine* present in the developer composition can be the same [amine] *alkanolamine* used to prepare the [carbonyl bisulfite-amine] *formaldehyde bisulfite-alkanolamine* condensation product or it can be a different [amine] *alkanolamine*.

The instant invention provides the solution to many problems which have occurred in machine processing of high-contrast photographic films. Drag streaks and dot distortions which are prevalent with previous developers have been very substantially reduced and the developer solution is stable so that it can be left in the machine processor for several weeks. Prior art developer solutions are very unstable and can be left in the machine processor at most for only several days and sometimes less than one day.

The shelf-life stability of my novel developer composition is also considerably improved. Prior art developers must be kept as two stock solutions to be mixed just prior to use in order not to lose photographic development activity caused by a reaction between sodium formaldehyde bisulfite and the other components of the developer composition. My novel developer composition can be stored as a single solution for up to about thirty days.

Another way of further decreasing drag streaks caused by machine processing is to use a higher concentration of developing agent than would normally be used and also [adding] *add* a small amount of 5- or 6-nitroindazole to the developer solution. A suitable concentration is from about 2 to about 12 cc. of a 1% solution of the 5- or 6-nitroindazole per liter of developer solution. The reduction in drag streaks is believed to occur because the 5- or 6-nitroindazole reduces the emulsion sensitivity to bromide ion which is released as an exhaustion product and also because the additional developing agent reduces the emulsion sensitivity to variations in developing agent concentration.

The high-contrast photographic elements which can be processed according to the instant invention comprise a silver halide emulsion layer in which the halide comprises at least 50 mole percent chloride. Preferably the silver halide emulsion comprises at least 85 mole percent chloride, the balance, if any, being bromide. Such preferred emulsions provide particularly good results in eliminating drag streaks and dot distortions. The silver halide emulsion can also contain a small amount of iodide, e.g., less than 5 mole percent, if desired. Silver halide emulsions comprising 100 mole percent chloride have also been found to be quite useful.

The silver halide emulsion layer of the high-contrast photographic elements which can be processed according to the instant invention can contain any of the hydrophilic water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the high-contrast photographic element can also contain dispersed polymerized vinyl compounds. Such compounds are disclosed, for example, in U.S. Pats. 3,142,568 of Nottorf issued July 28, 1964; 3,193,386 of White issued July 6, 1965; 3,062,674 of Houck, Smith and Yudelson issued Nov. 6, 1962; and 3,220,844 of Houck, Smith and Yudelson issued Nov. 30, 1965; and include the water-insoluble polymers of alkyl acrylates and methacrylates, acrylic acid, sulfoalkyl acrylates or methacrylates, interpolymers of alkyl acrylates with acrylic acids, acryloyloxy alkyl sulfonic acids, acetoacetoxy alkyl acrylates such as 2-acetoacetoxyethyl methacrylate and the like. These compounds can also be incorporated into a separate layer of the photographic element. The vinyl polymers are generally employed in concentrations in the range of about 20 to about 80%, most often concentrations at least 50%, by weight, based on the weight of the binding agent. Silver halide emulsions wherein the binding agent contains dispersed polymerized vinyl compound provide particularly good results in eliminating drag streaks and dot distortions.

The silver halide emulsion of the high-contrast photographic elements which can be processed according to the instant invention can be coated on a wide variety of supports. Hydrophilic colloid layers can be coated on one or both sides of the support if desired. Typical supports are cellulose nitrate film, cellulose ester film, polyvinyl acetal film, polystyrene film, poly(ethylene terephthalate) film, and related films or resinous materials, as well as glass, paper, metal and the like. Supports such as paper, which are coated with $\alpha$-olefin polymers, particularly polymers of $\alpha$-olefins containing two or more carbon atoms, as exemplified by polyethylene, polypropylene, ethylene-butene copolymers and the like can also be employed.

The silver halide emulsions of the high-contrast photographic elements which can be processed according to the instant invention can be sensitized using any of the well-known techniques in emulsion making, for example, by digesting with naturally active gelatin or various sulfur, selenium, tellurium compounds and/or gold compounds. The emulsions can be sensitized with salts of noble metals of Group VIII of the Periodic Table which have an atomic weight greater than 100. The emulsions can also contain addenda which increase speed and/or contrast such as quaternary ammonium salts, polyethylene glycols, thioether sensitizers or combination thereof.

The silver halide emulsion of the high-contrast photographic elements which can be processed according to the instant invention can conveniently be ortho-sensitized or pan-sensitized with spectral sensitizing dyes. For instance, these emulsions can be spectrally sensitized by treating with a solution of a sensitizing dye in an organic solvent. Sensitizing dyes useful in sensitizing such emulsions are described, for example, in U.S. Pats. 2,526,632 of Brooker and White issued Oct. 24, 1950, and 2,503,776 of Sprague issued Apr. 11, 1950. Spectral sensitizers which can be used are the cyanines, mero-cyanines, complex (trinuclear) cyanines, complex (trinuclear) mero-cyanines, styryls, and hemicyanines.

The silver halide emulsion of the high-contrast photographic elements which can be processed according to the instant invention can also contain conventional addenda such as gelatin plasticizers, coating aids, antifoggants such as the azaindines and hardeners such as aldehyde hardeners, e.g., formaldehyde, mucochloric acid, glutaraldehyde bis(sodium bisulfite), maleic dialdehyde, aziridines, dioxane derivatives and oxypolysaccharides.

The following examples will illustrate the invention but are not to be construed to limit it in any way.

Example 1.—In order to compare my invention with the prior art, the following aqueous developer compositions are prepared:

(A) Developer composition of the invention:

| | Grams |
|---|---|
| Sodium-bis-(2-hydroxyethyl)-aminomethane sulfonate[1] | 82.0 |
| Sodium sulfite | 3.0 |
| Boric acid | 7.5 |
| Hydroquinone | 22.5 |
| Potassium bromide | 1.6 |
| 2,2'-iminodiethanol | 39.0 |
| Water to make 1 liter. | |
| pH 9.5 | |

(B) Developer composition similar to the invention:

| | Grams |
|---|---|
| Sodium formaldehyde bisulfite | 50.0 |
| Sodium sulfite | 3.0 |
| Boric acid | 7.5 |
| Hydroquinone | 22.5 |
| Potassium bromide | 1.6 |
| Sodium carbonate (monohydrate) | 45.0 |
| Water to make 1 liter. | |
| pH 9.8 | |

(C) Kodak developer D-85

| | Grams |
|---|---|
| Sodium sulfite | 30.0 |
| Paraformaldehyde | 7.5 |
| Sodium bisulfite | 2.2 |
| Boric acid | 7.5 |
| Hydroquinone | 22.5 |
| Potassium bromide | 1.6 |

-continued

| |
|---|
| Water to make 1 liter. |
| pH 10.1 |

[1]Sodium formaldehyde bisulfite and 2,2'-iminodiethanol can be used to form this compound in situ.

These developer compositions are used in a Kodalith Roller Transport 324 Film Processor, of the type shown in U.S. Pat. No. 3,025,779 of Russell et al issued Mar. 20, 1962, and used to process 8 × 10-inch sheets of a high-contrast silver chlorobromide gelatin emulsion coated on a film support, after exposing to a halftone image, with the following results:

| Developer composition | Drag Streaks | Dot Size |
|---|---|---|
| A (Invention) | None | Uniform |
| B (Similar to invention) | Severe | Non-uniform, distorted |
| C (Kodak developer D-85) | do | Do |

Example 2.—This example illustrates the stability of the developer composition of my invention which contains at least 0.075 mole of free [amine] *alkanolamine* per liter of developer composition. An aqueous stock solution is prepared containing the following ingredients:

| | Mole |
|---|---|
| Sodium-bis(2-hydroxyethyl)-aminomethane sulfonate[1] | 0.333 |
| Hydroquinone | 0.136 |
| Potassium bromide | 0.009 |
| Water to make 1 liter | |

[1]Sodium formaldehyde bisulfite and 2,2'-iminodiethanol can be used to form this compound in situ.

To several portions of this stock solution are added 2,2'-iminodiethanol in varying amounts. The developer compositions are then used to develop (if possible) for 3 minutes at 68° F a piece of exposed high-contrast film as in Example 1. Separate portions of each composition are then incubated in full glass bottles at 120° F in the dark. After 1 and 3 days, the developer compositions are used to develop for 3 minutes at 68° F another piece of exposed high-contrast film with the following results:

| Developer composition | pH | 2,2'-iminodiethonal added (moles/liter) | Speed change after 1 day's incubation (log E) | Speed change after 3 days' incubation (log E) |
|---|---|---|---|---|
| D (control)[1] | 9.3 | 0 | | |
| E (control)[2] | 9.8 | 0 | +.5 | +.6 |
| F[2] | 9.8 | 0.029 | +.5 | +.6 |
| G[2] | 9.8 | 0.057 | +.6 | +.7 |
| H | 9.5 | 0.114 | +.3 | +.3 |
| I[3] | 9.5 | 0.228 | +.2 | +.2 |
| J[3] | 9.5 | 0.457 | 0 | 0 |
| K[3] | 9.5 | 0.914 | −.1 | −.2 |

[1]Is not active enough to develop the high-contrast film in three minutes.
[2]$Na_2CO_3 \cdot H_2O$ has to be added to increase the pH in order to obtain development.
[3]$H_3BO_3$ has to be added to lower the pH to same value as composition H.

From the above table it is seen that when at least 0.075 mole of free [amine] *alkanolamine* per liter of developer composition is added, the speed change is reduced by about 50%. Quantities of free [amine] *alkanolamine* less than this amount give results as bad or worse than the control. The optimum concentration is found to be 0.457 mole of free [amine] *alkanolamine* per liter of developer composition where no speed change at all is found, indicating that the developer composition is stable.

Although the invention has been described in considerable detail with reference to certain preferred embodiments thereof, variations and modifications can be effected within the spirit and scope of the invention as described hereinbefore and as defined in the appended claims.

I claim:

1. A liquid photographic developer composition comprising:

a. a *dihydroxybenzene* silver halide developing agent, b. a [carbonyl] *formaldehyde* bisulfite-alkanolamine condensation product, and c. at least about 0.075 mole of free [amine] *alkanolamine* per liter of developer composition.

2. The composition of claim 1 wherein said developing agent is present in a concentration of from about 0.05 to about 0.50 mole per liter of developer composition, said [carbonyl] *formaldehyde* bisulfite-alkanolamine condensation product is present in a concentration of from about 0.10 to about 1.0 mole per liter of developer composition and said free alkanolamine is present in a concentration of from about 0.075 to about 3.0 moles per liter of developer composition.

[3. The composition of claim 2 wherein said developing agent is a dihydroxybenzene developing agent and said carbonyl bisulfite-alkanolamine condensation product is a formaldehyde bisulfite-alkanolamine condensation product.]

4. The composition of claim [3] *2* wherein said dihydroxybenzene developing agent is hydroquinone.

5. The composition of claim [3] *2* which also contains 5-nitroindazole or 6-nitroindazole.

6. The composition of claim 4 wherein said formaldehyde bisulfite-alkanolamine condensation product is sodium-bis-(2-hydroxyethyl)aminomethane sulfonate and said free alkanolamine is 2,2'-iminodiethanol.

7. The composition of claim 6 wherein said hydroquinone is present in a concentration of about 0.136 mole per liter of developer composition, said sodium-bis(2-hydroxyethyl)aminomethane sulfonate is present in a concentration of about 0.33 mole per liter of developer composition and said 2,2'-iminodiethanol is present in a concentration of about 0.457 mole per liter of developer composition.

8. In a continuous process for processing an exposed, high-contrast, photographic element wherein said element is processed in one continuous motion by transporting it into and out of at least one processing solution, the improvement comprising developing said element in a liquid developer composition comprising:

a. a *dihydroxybenzene* silver halide developing agent, b. a [carbonyl] *formaldehyde* bisulfite-alkanolamine condensation product, and c. at least about 0.075 mole of free [amine] *alkanolamine* per liter of developer composition.

9. The process of claim 8 wherein said developing agent is present in a concentration of from about 0.05 to about 0.50 mole per liter of developer composition, said [carbonyl] *formaldehyde* bisulfite-alkanolamine condensation product is present in a concentration of from about 0.10 to about 1.0 mole per liter of developer composition and said free alkanolamine is present in a concentration of from about 0.075 to about 3.0 moles per liter of developer composition.

[10. The process of claim 9 wherein said developing agent is a dihydroxybenzene developing agent and said carbonyl bisulfite-alkanolamine condensation product is a formaldehyde bisulfite-alkanolamine condensation product.]

11. The process of claim [10] *9* wherein said dihydroxybenzene developing agent is hydroquinone.

12. The process of claim [10] *9* wherein said developer composition also contains 5-nitroindazole or 6-nitroindazole.

13. The process of claim [10] *9* wherein said photographic element comprises a silver halide emulsion in which the halide comprises at least 85 mole percent chloride.

14. The process of claim [10] *9* wherein said photographic element comprises a silver halide emulsion in which the halide comprises at least 90 mole percent chloride, substantially no iodide and the balance bromide.

15. The process of claim 13 wherein said silver halide emulsion contains a mixture of gelatin and a vinyl polymer as the binding agent.

16. The process of claim 15 wherein said vinyl polymer is a water-insoluble polymer of an alkyl acrylate or alkyl methacrylate.

17. The process of claim 11 wherein said formaldehyde bisulfite-alkanolamine condensation product is sodium-bis-(2-hydroxyethyl)aminomethane sulfonate and said free alkanolamine is 2,2′-iminodiethanol.

18. The process of claim 17 wherein said hydroquinone is present in a concentration of about 0.136 mole per liter of developer composition, said sodium-bis(2-hydroxyethyl)aminomethane sulfonate is present in a concentration of about 0.33 mole per liter of developer composition and said 2,2′-iminodiethanol is present in a concentration of about 0.457 mole per liter of developer composition.

19. The process of claim [10] *9* wherein said photographic element is transported by rollers.

* * * * *